US008243013B1

(12) United States Patent
Sprague et al.

(10) Patent No.: US 8,243,013 B1
(45) Date of Patent: Aug. 14, 2012

(54) DRIVING BISTABLE DISPLAYS

(75) Inventors: Robert Sprague, Saratoga, CA (US); Wanheng Wang, Pleasanton, CA (US); Yajuan Chen, Fremont, CA (US); Andrew Ho, Atherton, CA (US); Bryan Hans Chan, San Francisco, CA (US); Jialock Wong, San Leandro, CA (US); Hong-Mei Zang, Sunnyvale, CA (US)

(73) Assignee: Sipix Imaging, Inc., Fremont, CA (US)

( * ) Notice: Subject to any disclaimer, the term of this patent is extended or adjusted under 35 U.S.C. 154(b) by 968 days.

(21) Appl. No.: 12/115,513

(22) Filed: May 5, 2008

Related U.S. Application Data

(60) Provisional application No. 60/915,902, filed on May 3, 2007.

(51) Int. Cl.
*G06F 3/045* (2006.01)

(52) U.S. Cl. .......................................... 345/107; 345/76

(58) Field of Classification Search .................. 345/107
See application file for complete search history.

(56) References Cited

U.S. PATENT DOCUMENTS 3,612,758 A 10/1971 Evans et al.
4,972,099 A 11/1990 Amano et al.
5,266,937 A 11/1993 DiSanto et al.
5,272,477 A 12/1993 Tashima et al.
5,930,026 A 7/1999 Jacobson et al.
5,961,804 A 10/1999 Jacobson et al.
6,019,284 A 2/2000 Freeman et al.
6,639,580 B1 10/2003 Kishi et al.
6,657,612 B2 12/2003 Machida et al.
6,671,081 B2 12/2003 Kawai
6,686,953 B1 2/2004 Holmes
6,774,883 B1 8/2004 Muhlemann
6,885,495 B2 4/2005 Liang et al.
6,902,115 B2 6/2005 Graf et al.
6,914,713 B2 7/2005 Chung et al.
6,930,818 B1 8/2005 Liang et al.
6,932,269 B2 8/2005 Sueyoshi et al.
6,950,220 B2 9/2005 Abramson et al.
6,995,550 B2 2/2006 Jacobson et al.
7,046,228 B2 5/2006 Liang et al.
7,177,066 B2 2/2007 Chung et al.
7,349,146 B1 3/2008 Douglass et al.
7,504,050 B2 3/2009 Weng et al.
7,626,444 B2 12/2009 Clewett et al.
7,733,311 B2 6/2010 Amundson et al.
7,800,580 B2 9/2010 Johnson et al.
7,839,381 B2 * 11/2010 Zhou et al. .................... 345/107

(Continued)

FOREIGN PATENT DOCUMENTS

JP 03282691 12/1991

(Continued)

OTHER PUBLICATIONS

U.S. Appl. No. 12/046,197, filed Mar. 11, 2008, Wang et al.

(Continued)

*Primary Examiner* — Amare Mengistu
*Assistant Examiner* — Shawna Stepp Jones
(74) *Attorney, Agent, or Firm* — Hickman Palermo Truong Becker Bingham Wong LLP

(57) ABSTRACT

The disclosure relates to waveforms, circuits and methods for driving bistable displays.

41 Claims, 8 Drawing Sheets

U.S. PATENT DOCUMENTS

| | | | | |
|---|---|---|---|---|
| 7,999,787 | B2 | 8/2011 | Amundson et al. | |
| 8,035,611 | B2 | 10/2011 | Sakamoto | |
| 2002/0021483 | A1 | 2/2002 | Katase | |
| 2002/0033792 | A1 | 3/2002 | Inoue | |
| 2003/0011868 | A1 | 1/2003 | Zehner et al. | |
| 2003/0035885 | A1 | 2/2003 | Zang et al. | |
| 2003/0067666 | A1 | 4/2003 | Kawai | |
| 2003/0095090 | A1 | 5/2003 | Ham | |
| 2003/0137521 | A1 | 7/2003 | Zehner et al. | |
| 2003/0227451 | A1 | 12/2003 | Chang | |
| 2004/0112966 | A1 | 6/2004 | Pangaud | |
| 2004/0120024 | A1 | 6/2004 | Chen et al. | |
| 2004/0219306 | A1 | 11/2004 | Wang et al. | |
| 2004/0263450 | A1 | 12/2004 | Lee et al. | |
| 2005/0001812 | A1 | 1/2005 | Amundson et al. | |
| 2005/0162377 | A1 | 7/2005 | Zhou et al. | |
| 2005/0163940 | A1 | 7/2005 | Liang et al. | |
| 2005/0179642 | A1 | 8/2005 | Wilcox et al. | |
| 2005/0185003 | A1* | 8/2005 | Dedene et al. | 345/694 |
| 2005/0219184 | A1 | 10/2005 | Zehner et al. | |
| 2006/0049263 | A1 | 3/2006 | Ou et al. | |
| 2006/0050361 | A1 | 3/2006 | Johnson | |
| 2006/0132426 | A1* | 6/2006 | Johnson | 345/107 |
| 2006/0139305 | A1 | 6/2006 | Zhou et al. | |
| 2006/0139309 | A1 | 6/2006 | Miyasaka | |
| 2006/0187186 | A1 | 8/2006 | Zhou et al. | |
| 2006/0209055 | A1 | 9/2006 | Wakita | |
| 2006/0238488 | A1 | 10/2006 | Nihei et al. | |
| 2006/0262147 | A1 | 11/2006 | Kimpe et al. | |
| 2007/0035510 | A1 | 2/2007 | Zhou et al. | |
| 2007/0046621 | A1 | 3/2007 | Suwabe et al. | |
| 2007/0052668 | A1 | 3/2007 | Zhou et al. | |
| 2007/0070032 | A1 | 3/2007 | Chung et al. | |
| 2007/0080926 | A1 | 4/2007 | Zhou et al. | |
| 2007/0080928 | A1 | 4/2007 | Ishii et al. | |
| 2007/0091117 | A1 | 4/2007 | Zhou et al. | |
| 2007/0103427 | A1 | 5/2007 | Zhou et al. | |
| 2007/0146306 | A1 | 6/2007 | Johnson et al. | |
| 2007/0188439 | A1 | 8/2007 | Kimura et al. | |
| 2007/0262949 | A1 | 11/2007 | Zhou et al. | |
| 2007/0296690 | A1 | 12/2007 | Nagasaki | |
| 2008/0150886 | A1 | 6/2008 | Johnson et al. | |
| 2008/0303780 | A1 | 12/2008 | Sprague et al. | |
| 2009/0096745 | A1 | 4/2009 | Sprague et al. | |
| 2009/0267970 | A1 | 10/2009 | Wong | |
| 2010/0134538 | A1 | 6/2010 | Sprague et al. | |
| 2010/0194733 | A1 | 8/2010 | Lin et al. | |
| 2010/0194789 | A1 | 8/2010 | Lin et al. | |
| 2010/0283804 | A1 | 11/2010 | Sprague et al. | |
| 2010/0295880 | A1 | 11/2010 | Sprague et al. | |
| 2011/0096104 | A1 | 4/2011 | Sprague et al. | |
| 2011/0175945 | A1 | 7/2011 | Lin | |
| 2011/0216104 | A1 | 9/2011 | Chan et al. | |

FOREIGN PATENT DOCUMENTS

| | | | |
|---|---|---|---|
| JP | 2000-336641 | | 1/2002 |
| KR | 1020090129191 | A | 12/2009 |
| WO | WO 01/67170 | | 9/2001 |
| WO | WO 2005004099 | A1 | 1/2005 |
| WO | WO 2005031688 | A1 | 4/2005 |
| WO | WO2005034076 | A1 | 4/2005 |
| WO | WO 2009/049204 | | 4/2009 |
| WO | WO 2010/132272 | | 11/2010 |

OTHER PUBLICATIONS

U.S. Appl. No. 12/155,513, filed May 5, 2008, Sprague et al.

U.S. Appl. No. 13/004,763, filed Jan. 11, 2011, Lin et al.

U.S. Appl. No. 13/152,140, filed Jun. 2, 2011, Lin.

Sprague, R.A. "Active Matrix Displays for e-Readers Using Microcup Electrophoretics". Presentation conducted at SID 2011, 49 International Symposium Seminar and Exhibition, dated May 18, 2011, 20 pages.

Korean Patent Office, "International Search Report & Written Opinion", dated Dec. 7, 2010, application No. PCT/US2010/033906, 9 pages.

Current Claims for Korean application No. PCT/US2010/033906, 1 page

Allen, K. (Oct. 2003). Electrophoretics Fulfilled. Emerging Displays Review: Emerging Display Technologies, Monthly Report—Oct. 2003, 9-14.

Bardsley, J.N. et al. (Nov. 2004) Microcup™ Electrophoretic Displays. USDC Flexible Display Report, 3.1.2. pp. 3-12-3-16.

Chaug, Y.S. al. (Apr. 2004). Roll-to-Roll Processes for the Manufacturing of Patterned Conductive Electrodes on Flexible Substrates. Mat. Res. Soc. Symp. Proc., vol. 814, I9.6.1.

Chen, S.M. (Jul. 2003) The Applications for the Revolutionary Electronic Paper Technology. OPTO News & Letters, 102, 37-41. (in Chinese, English abstract).

Chen, S.M. (May 2003) The New Application and the Dynamics of Companies. TRI. 1-10. (In Chinese, English abstract).

Chung, J. et al. (Dec. 2003). Microcup® Electrophoretic Displays, Grayscale and Color Rendition. IDW, AMD2/EP1-2, 243-246.

Ho, A. (Nov. 2006) Embedding e-Paper in Smart Cards, Pricing Labels & Indicators. Presentation conducted at Smart Paper Conference Nov. 15-16, 2006, Atlanta, GA.

Ho, C. et al. (Dec. 2003). Microcup® Electronic Paper by Roll-to-Roll Manufacturing Processes. Presentation conducted at FEG, Nei-Li, Taiwan, 36 pages.

Ho, C. (Feb. 1, 2005) Microcupt® Electronic Paper Device and Applicaiton. Presentation conducted at USDC 4th Annual Flexible Display Conference 2005, 36 pages.

Hopper, et al. (1979) An Electrophoretic Display, Its Properties, Model and Addressing. IEEE Trans. Electr. Dev., ED 26, No. 8, pp. 1148-1152.

Hou, J. et al. (May 2004). Reliability and Performance of Flexible Electrophoretic Displays by Roll-to-Roll Manufacturing Processes. SID Digest, 32.3, 1066-1069.

Howard, R. (Feb. 2004) Better Displays with Organic Films. Scientific American, pp. 76-81.

Kishi, et al., Development of In-plane EPD, SID 2000 Digest, pp. 24-27.

Lee, H. et al. (Jun. 2003) SiPix Microcup® Electronic Paper—An Introduction. Advanced Display, Issue 37, 4-9 (in Chinese, English abstract).

Liang, R.C. (Feb. 2003) Microcup® Electrophoretic and Liquid Crystal Displays by Roll-to-Roll Manufacturing Processes. Presentation conducted at the Flexible Microelectronics & Displays Conference of U.S. Display Consortium, Phoenix, Arizona, USA, 18pages.

Liang, R.C. (Apr. 2004). Microcup Electronic Paper by Roll-to-Roll Manufacturing Process. Presentation at the Flexible Displays & Electronics 2004 of Intertech, San Francisco, California, USA, 26 pages.

Liang, R.C. (Oct. 2004) Flexible and Roll-able Displays/Electronic Paper—A Technology Overview. Paper presented at the METS 2004 Conference in Taipei, Taiwan, 27 pages.

Liang, R. et al. (2003) Microcup® Active and Passive Matrix Electrophoretic Displays by a Roll-to-Roll Manufacturing Processes. SID Digest, 20.1, 4 pages.

Liang, R. et al. (Dec. 2002) Microcup Electrophoretic Displays by Roll-to-Roll Manufacturing Processes. IDW, EP2-2, 1337-1340.

Liang, R. et al. (Feb. 2003). Passive Matrix Microcup® Electrophoretic Displays. Paper presented at the IDMC, Taipei, Taiwan, 4 pages.

Liang, R. et al. (2003). Microcup® displays : Electronic Paper by Roll-to-Roll Manufacturing Processes. Journal of the SID, 11(4), 621-628.

Liang, R. et al. (Jun./Jul. 2004) << Format Flexible Microcup® Electronic Paper by Roll-to-Roll Manufacturing Process >>, Presentation conducted at the 14th FPD Manufacturing Technology EXPO & Conference, 44 pages.

Liang, R. et al. (Feb. 2003). Microcup® LCD, A New Type of Dispersed LCD by a Roll-to-Roll Manufacturing Process. Paper presented at the IDMC, Taipei, Taiwan, 4 pages.

Liang, R. et al., Nikkei Microdevices. (Dec. 2002) Newly-Developed Color Electronic Paper Promises—Unbeatable Production Efficiency. Nikkei Microdevices, p3. (in Japanese, with English translation) 4 pages.

Swanson, et al., High Performance EPDs, SID 2000, pp. 29-31.

Wang, X. et al. (Feb. 2004). Mirocup® Electronic Paper and the Converting Processes. ASID, 10.1.2-26, 396-399, Nanjing, China.
Wang, X. et al. (Jun. 2004) Microcup® Electronic Paper and the Converting Processes. Advanced Display, Issue 43, 48-51 (in Chinese, English abstract).
Wang, X. et al. (Feb. 2006) Inkjet Fabrication of Multi-Color Microcup® Electrophorectic Display. the Flexible Microelectronics & Displays Conference of U.S. Display Consortium, 11 pages.
Wang, X. et al. (Jun. 2006) Roll-to-Roll Manufacturing Process for Full Color Electrophoretic film. SID 2006 Digest, pp. 1587-1589.
Zang, H. (Feb. 2004). Microcup Electronic Paper. Presentation conducted at the Displays & Microelectronics Conference of U.S. Display Consortium, Phoenix, Arizona, USA, 14 pages.
Zang, H. (Oct. 2003). Microcup® Electronic Paper by Roll-to-Roll Manufacturing Processes. Presentation conducted at the Advisory Board Meeting, Bowling Green State University, Ohio, USA, 18 pages.
Zang, H. et al. (Feb. 2005) Flexible Microcup® EPD by RTR Process. Presentation conducted at 2nd Annual Paper-Like Displays Conference, Feb. 9-11, 2005, St. Pete Beach, Florida, 26 pages.
Zang, H. et al. (2003) Microcup Electronic Paper by Roll-to-Roll Manufacturing Processes. The Spectrum, 16(2), 16-21.
Zang, H. et al. (Jan. 2004). Threshold and Grayscale Stability of Microcup® Electronic Paper. Proceeding of SPIE-IS&T Electronic Imaging, SPIE vol. 5289, 102-108.
Zang, H. et al. (May 2006) Monochrome and Area Color Microcup® EPDs by Roll-to-Roll Manufacturing Processes. ICIS ' 06 International Congress of Imaging Science Final Program and Proceedings, pp. 362-365.
Liang, R. Flexible and Roll-able Displays/Electronic Paper—A Brief Technology Overview. Flexible Display Forum (Feb. 2005) Taiwan, 27 pages.
U.S. Appl. No. 12/132,238, filed Jun. 3, 2008, Office Action, Mailed Nov. 9, 2011.
Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.
Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.
Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2, 2 pgs.
Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2, 2 pgs.
Kao, WC., Fang, CY., Chen, YY., Shen, MH., and Wong, J. (Jan. 2008) Integrating Flexible Electrophoretic Display And One-Time Password Generator in Smart Cards. *ICCE 2008 Digest of Technical Papers*, P4-3. (Int'l Conference on Consumer Electronics, Jan. 9-13, 2008), 2 pgs.
U.S. Appl. No. 13/289,403, filed Nov. 4, 2011, Lin et al.
U.S. Appl. No. 12/046,197, filed Mar. 11, 2008, Office Action, mailed Feb. 15, 2012.
U.S. Appl. No. 12/132,238, filed Jun. 3, 2008, Final Office Action, mailed May 1, 2012.
U.S. Appl. No. 11/607,757, filed Nov. 30, 2006, Final Office Action, mailed April 6, 2012.

* cited by examiner

EPD Image Quality Optimization

Waveform Circuit Architecture

DRIVING BISTABLE DISPLAYS

BENEFIT CLAIM

This application claims the benefit under 35 USC 119(e) of prior provisional application 60/915,902, filed May 3, 2007, the entire contents of which are hereby incorporated by reference as if fully set forth herein.

FIELD OF THE DISCLOSURE

The present disclosure relates to waveforms, methods and circuits for driving bistable displays such as electrophoretic displays.

BACKGROUND

The electrophoretic display (EPD) is a non-emissive device based on the electrophoresis phenomenon of charged pigment particles suspended in a solvent. The display usually comprises two plates with electrodes placed opposing each other, separated by spacers. One of the electrodes is usually transparent. A suspension composed of a colored solvent and charged pigment particles is enclosed between the two plates. When a voltage difference is imposed between the two electrodes, the pigment particles migrate to one side or the other, according to the polarity of the voltage difference. As a result, either the color of the pigment particles or the color of the solvent is seen from the viewing side. Alternatively, the suspension may comprise a clear solvent and two types of colored particles which migrate to opposite sides of the device when a voltage is applied. Further alternatively, the suspension may comprise a dyed solvent and two types of colored particles which alternate to different sides of the device. In addition, in-plane switching structures have been shown where the particles may migrate in a planar direction to produce different color options.

There are several different types of EPDs, such as the conventional type EPD, the microcapsule-based EPD or the EPD with electrophoretic cells that are formed from parallel line reservoirs. EPDs comprising closed cells formed from microcups filled with an electrophoretic fluid and sealed with a polymeric sealing layer is disclosed in U.S. Pat. No. 6,930,818, the entire contents of which are hereby incorporated by reference as if fully set forth herein.

There are many ways to switch the image on an electrophoretic display from one image to another that use direct transitions from one to the other and bipolar driving. Driving method may involve writing of the first image to a uniform dark or white state and then to the second image, writing the first image to a uniform white state then a dark state and then to the second image, cycling the dark to white image many times before writing the second image, writing complex checkerboard patterns between images, and so forth. The purposes of such complex waveforms are to prevent residual images by ensuring full erasure of one image before writing the other.

However, there are many characteristics of prior waveforms which will cause image degradation. Residual image poor bistability, improper grey level setting, changes in performance with time, temperature, and light and so forth are many known problems that current waveforms cause when used to write an electrophoretic display.

SUMMARY OF THE DISCLOSURE

In an embodiment, the disclosure provides waveforms, circuits and methods for driving bistable displays. In one aspect, the disclosure provides a method, comprising in combination: applying, across a bistable display device, a prewriting signal comprising a plurality of DC voltage pulses each driven for a first time that is shorter than necessary to drive the display device to a particular state; applying, across the device, a shaking signal comprising a plurality of positive and negative pulses each driven for a second time that is too fast to switch the media but fast enough to disperse partially packed particles; applying, across the device, one or more driving signals for third times that are sufficient to drive segments of the device to particular display states.

In one embodiment, any of the first time and second time is in the range 10 milliseconds (ms) to 500 ms. In an embodiment, the first time is 100 ms and the second time is 200 ms.

In an embodiment, the pre-writing signal comprises a first plurality of DC balanced DC voltage pulses each driven the first time and a second plurality of DC balanced DC voltage pulses each driven for a fourth time, and the fourth time is longer than the first time. In an embodiment, the first time is 100 ms and the second time is 250 ms.

In an embodiment, the third times are long enough to cause electrophoretic particles in the display device to cross media cells of the display device to result in changing an appearance of an image on the display device but short enough to prevent charge buildup within the media cells.

In an embodiment, the method further comprises receiving an ambient temperature value representing a then-current ambient temperature of the display device; increasing each of the first time, the second time, and the third times inversely as a function of the ambient temperature value.

In an embodiment, the method further comprises determining an idle time of the display device representing a last time at which a driving signal was applied to the display device; increasing the third times as a function of a magnitude of the idle time. In an embodiment, the method further comprises determining an idle time of the display device representing a last time at which a driving signal was applied to the display device; repeating the applying steps one or more times as a function of a magnitude of the idle time.

In an embodiment, the method further comprises determining an operating time of the display device representing a total time during which the display device has operated; as a function of a magnitude of the operating time, performing any one or more of: increasing the third times as a function of the magnitude; increasing a voltage of the driving signals as a function of the magnitude; repeating the applying steps one or more times.

In an embodiment, the method further comprises determining a light exposure value representing an amount of light exposure that the display device has received; as a function of a magnitude of the light exposure value, performing any one or more of: increasing the third times as a function of the magnitude; increasing a voltage of the driving signals as a function of the magnitude; repeating the applying steps one or more times.

In an embodiment, average voltages of the pre-writing signal and of the driving signal are substantially zero when integrated over a time period.

In an embodiment, a method comprises in combination: applying, across a bistable display device, a shaking signal comprising a plurality of positive and negative pulses each driven for a first time that is too fast to switch the media but fast enough to disperse partially packed particles; applying, across the device, one or more first driving signals for second times that are sufficient to drive segments of the device to particular display states; concurrently with the first driving signals, applying across the device a second driving signal comprising a plurality of DC voltage pulses each driven for a third time that is shorter than necessary to drive the display device to a particular state.

In an embodiment, an electronic circuit comprises in combination: a field programmable gate array (FPGA); a driver circuit coupled to the FPGA and configured to drive a bistable display device having a common conductor and an image driving conductor; and the FPGA is configured to receive a supply voltage and to generate, in response to a trigger signal, an output signal comprising: a pre-writing signal comprising a plurality of DC voltage pulses each driven for a first time that is shorter than necessary to drive the display device to a particular state; a shaking signal comprising a plurality of positive and negative pulses each driven for a second time that is too fast to switch the media but fast enough to disperse partially packed particles; one or more driving signals for third times that are sufficient to drive segments of the device to particular display states.

In an embodiment, the pre-writing signal comprises a first plurality of DC balanced DC voltage pulses each driven the first time and a second plurality of DC balanced DC voltage pulses each driven for a fourth time, and the fourth time is longer than the first time. In an embodiment, the third times are long enough to cause electrophoretic particles in the display device to cross media cells of the display device to result in changing an appearance of an image on the display device but short enough to prevent charge buildup within the media cells.

In an embodiment, the circuit further comprises a temperature compensation circuit coupled to the FPGA and configured to generate an ambient temperature value representing a then-current ambient temperature of the display device; gates in the FPGA configured for increase each of the first time, the second time, and the third times inversely as a function of the ambient temperature value.

In an embodiment, the circuit further comprises a clock circuit coupled to the FPGA and configured to determine an idle time of the display device representing a last time at which a driving signal was applied to the display device; gates in the FPGA configured to increase the third times as a function of a magnitude of the idle time.

In an embodiment, the circuit further comprises a clock circuit coupled to the FPGA and configured to determine an operating time of the display device representing a total time during which the display device has operated; gates in the FPGA configured to perform, as a function of a magnitude of the operating time, any one or more of: increasing the third times as a function of the magnitude; increasing a voltage of the driving signals as a function of the magnitude; repeating the applying steps one or more times.

In an embodiment, the circuit further comprises a light exposure circuit coupled to the FPGA and configured to determine a light exposure value representing an amount of light exposure that the display device has received; gates in the FPGA configured to perform, as a function of a magnitude of the light exposure value, any one or more of: increasing the third times as a function of the magnitude; increasing a voltage of the driving signals as a function of the magnitude; repeating the applying steps one or more times.

The driving methods of the present disclosure can be applied to drive electrophoretic displays including, but not limited to, one time applications or multiple display images. They may also be used for any display devices which require fast optical response and interruption of display images.

Many other features, aspects and embodiments are described and recited in the remainder of the disclosure and in the appended claims; the preceding summary is not intended to be exhaustive.

DETAILED DESCRIPTION

Bistable Displays Such as Electrophoretic Displays

Each of U.S. Pat. No. 7,177,066, U.S. application 60/894,419, filed Mar. 12, 2007, and U.S. application Ser. No. 11/972,150, filed Jan. 10, 2008, is hereby incorporated by reference in its entirety for all purposes as if fully set forth herein.

Figure 1:
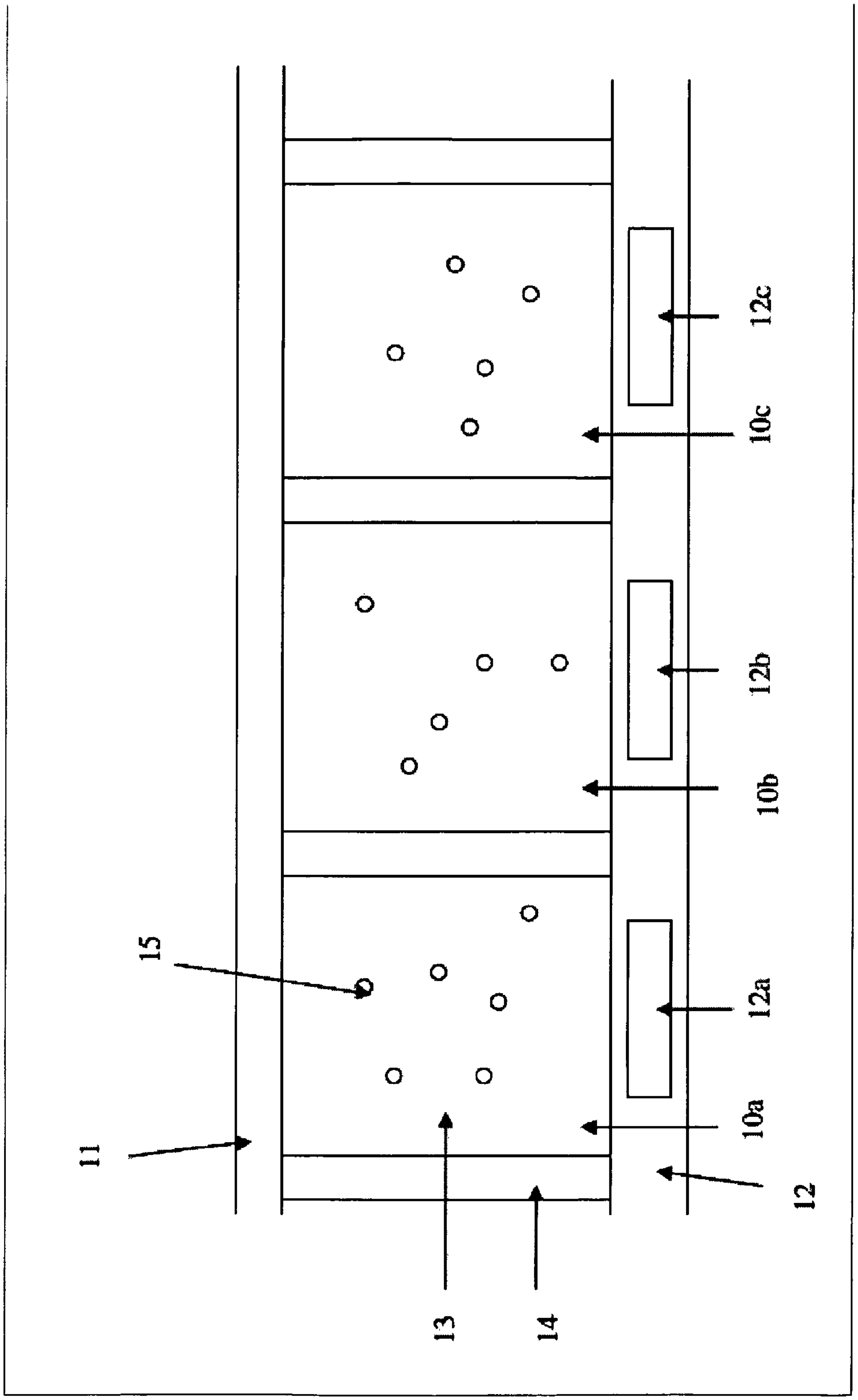
FIG. 1 is a cross-section view of an example display device.

FIG. 1 illustrates an array of display cells (10*a*, 10*b* and 10*c*) in an electrophoretic display which may be driven by the driving methods of the present disclosure. In FIG. 1, the display cells are provided, on its front (or viewing) side (top surface as illustrated in FIG. 1) with a common electrode (11) (which usually is transparent) and on its rear side with a substrate (12) carrying a set of discrete pixel electrodes (12*a*, 12*b* and 12*c*). Each of the discrete pixel electrodes (12*a*, 12*b* and 12*c*) defines a pixel of the display. An electrophoretic fluid (13) is filled in each of the display cells. For ease of illustration, FIG. 1 shows only a single display cell associated with a discrete pixel electrode, although in practice a plurality of display cells (as a pixel) may be associated with one discrete pixel electrode. The electrodes may be segmented in nature rather than pixellated, defining regions of the image instead of individual pixels. Therefore while the term "pixel" or "pixels" is frequently used in the application to illustrate the driving methods herein, it is understood that the driving methods are applicable to not only pixellated display devices, but also segmented display devices.

Each of the display cells is surrounded by display cell walls (14). For ease of illustration of the methods described below, the electrophoretic fluid is assumed to comprise white charged pigment particles (15) dispersed in a dark color solvent and the particles (15) are positively charged so that they will be drawn to the discrete pixel electrode or the common electrode, whichever is at a lower potential.

The driving methods herein also may be applied to particles (15) in an electrophoretic fluid which are negatively charged. Also, the particles could be dark in color and the solvent light in color so long as sufficient color contrast occurs as the particles move between the front and rear sides of the display cell. The display could also be made with a transparent or lightly colored solvent with particles of two different colors and carrying opposite charges.

The display cells may be the conventional partition type of display cells, the microcapsule-based display cells or the microcup-based display cells. In the microcup-based display cells, the filled display cells may be sealed with a sealing layer (not shown in FIG. 1). There may also be an adhesive layer (not shown) between the display cells and the common electrode. The display of FIG. 1 may further comprise color filters.

Driving Waveform Examples

According to an embodiment, driving circuits, waveforms, and methods are provided for driving a bistable display without causing image degradation arising from residual image poor bistability, improper grey level setting, and changes in time, temperature, and light levels. Each waveform characteristic described herein may be achieved or embodied using a digital electronic circuit that generates one or more output electrical signals that conform to the waveforms described herein. Specific waveforms may use any of several times, numbers of cycles, levels of cycles, speeds of transition, and other characteristics. The waveform characteristics and principles described herein have been found useful in establishing good performance of bistable displays.

DC BALANCE. In an embodiment, a waveform has equal amounts of positive and negative time-averaged voltage placed across the media, comprising an electrophoretic display cell array. Such a waveform, having zero DC balance, prevents charge-carrying particles within the media from building up and providing a counter voltage that opposes the applied field, and that will change with time. Such opposing fields would, if allowed to form, cause some particles in the media to switch state even when the voltage is turned off, thus reducing bistability.

Figure 2:
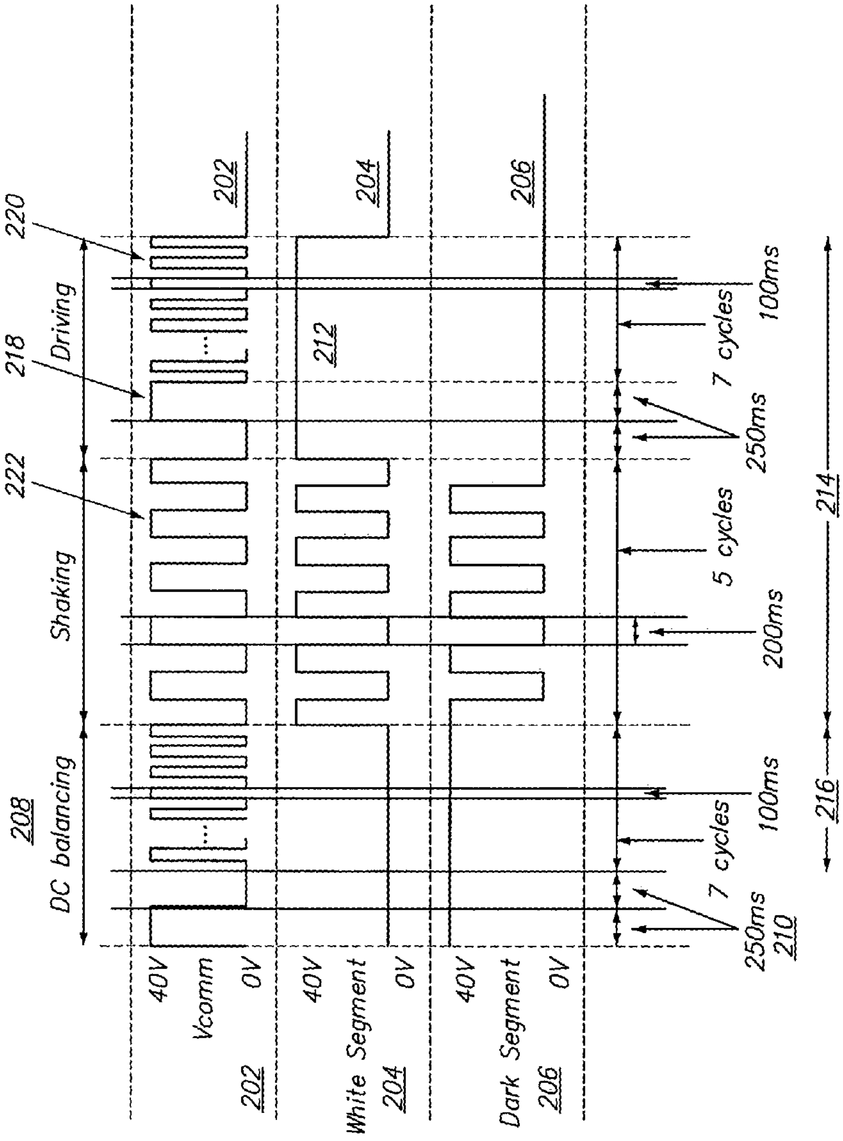
FIG. 2 illustrates example driving waveforms.

FIG. 2 illustrates example driving waveforms. In FIG. 2, three waveforms 202, 204, 206 are illustrated. First waveform 202 comprises a DC balancing frame 208 in which a voltage is applied across the media for an equal amount of time as driving pulses 218. For example, pulses 210 comprise a positive driving pulse of +40V for Vcomm and a zero voltage driving pulse each of 250 milliseconds (ms). Further, in all other frames of waveforms 202, 204, 206 each driving pulse has a corresponding complementary driving pulse at the opposite amplitude for an equal time period. Therefore, the waveforms 202, 204, 206 are DC balanced.

LENGTH OF TIME FOR THE WRITE WAVEFORM. In an embodiment, when a pulse is applied to drive the electrophoretic display, it is chosen to be an optimal length. If the pulse length is too short, then the electrophoretic (EP) particles will not have sufficient time to cross the media to result in changing the image appearance and poor bistability. If the drive pulse is too long, then conductivity of the EP material will cause charge buildup within the media, which will provide a reverse bias voltage across the media after the drive waveform is turned off, resulting in the full or partial switching of the media, and thus degrading bistability. As an example of one such media used for the waveform in FIG. 2, the rise time to 90% contrast is about 700 milliseconds, but the optimal writing pulse ON time is about 1400 milliseconds for full contrast and bistability. Therefore, in an embodiment, a driving waveform pulse 212 is used having a pulse duration of between 700 ms and 1400 ms.

TEMPERATURE COMPENSATION. The rise time of the media varies with temperature so that the optimal drive waveform pulse length must be much longer at low temperature to reach saturation contrast. Thus, a fixed-length drive waveform will not be long enough to drive to saturation at some low temperature and will be so long at a higher temperature that a reverse bias voltage will build up in the media due to the finite conductive of the media as described above. For example, a particular known media will respond in 700 milliseconds at room temperature but require 10 seconds to respond at a temperature of 0 degrees Celsius. In an embodiment, a circuit for generating a waveform of a signal for driving an EP display comprises a temperature compensation circuit in combination with circuits that implement one or more other of the approaches described herein. Temperature compensation is an approach in which the ambient temperature or media temperature is sensed using electronics, and in response, the circuit lengthens the waveform to an optimal length chosen for the particular ambient temperature of operation. Temperature compensation techniques are described, for example, in prior application Ser. No. 11/972,150, filed Jan. 10, 2008.

IMAGE HISTORY COMPENSATION. The first time a waveform is applied to the media, after the media has been idle for some time, the response of the media will either be slow or incomplete or both. In an embodiment, the drive waveform length is adjusted in length based on the length of time since the media was most recently cycled. In an embodiment, adjusting the drive waveform length comprises lengthening each drive pulse length, or cycling the write waveform more than once if the media has been idle for a long period of time before a media write operation occurs. In an embodiment, the waveform length is selected from a lookup table or calculated based on a known formula representing a lookup table that uses the length of time since the last image write as a variable in the calculation. The lookup table may identify a waveform length value in association with media characteristics such as dye form, cell size, thickness or width, or other design parameters. In an embodiment, a circuit for implementing this approach includes a counter circuit that measures the amount of time since the last image write; if the counter exceeds a specified threshold value, then the drive waveform length is increased as indicated above and the counter is reset. Alternatively, the circuit stores a timestamp at the time of each image write, and before an image write, the last timestamp is retrieved and compared to the current time.

LIFETIME AND LIGHT EXPOSURE COMPENSATION FOR RISE TIME. The rise time of electrophoretic media will change with time and exposure to light. In an embodiment, a compensation circuit may measure time, amount of light exposure, or both, and in response to the measurements, the circuit can adjust the write waveform length or voltage, or both, so that the same image performance is achieved over the lifetime the of an EP display.

WAVEFORM SEGMENT PULSING FOR ELIMINATING REVERSE BIAS EFFECT. As described above, a long voltage waveform drives the media to saturation, but generates a reverse bias voltage. This effect can be reduced by breaking the long waveform into shorter pulsed segments or frames which allow the reverse voltage to discharge itself between short pulses. That is, the sum of the short pulses is made long enough to meet the optimal time on for the drive waveform described above, but the off state time is made long enough to allow the reverse bias charge to discharge.

The exact timing of these pulses depends on the particular media characteristics for operation at different temperature, different lifetimes, etc. so it may be desirable to tune the timing with the compensation circuit described above. In the example of FIG. 2, pre-writing waveform segment 216 is broken mostly into 100 millisecond pulses with 100 millisecond gaps between them, and the sum of the on write time of the pulses is 700 milliseconds (7 pulses) (in addition to an initial 250 millisecond pulse length) and the 100 millisecond time being long enough to allow discharge of the reverse bias image between pulses. Similarly, in FIG. 2, driving pulses 218, 220 applied to a common terminal as part of waveform 202 also is divided into 100 millisecond pulses with 100 millisecond gaps between them, and the sum of the on write time of the pulses is 700 milliseconds (7 pulses) (in addition to an initial 250 millisecond pulse length).

LONGER FIRST PULSE DRIVING. As shown FIG. 2, an additional feature of this waveform is a longer first pulse 218 at the beginning of the driving pulse region. The first pulse 218 is 250 milliseconds long while the remaining pulses 220 are 100 milliseconds long. As described above, the 100 millisecond timing has been found to eliminate reverse bias effect. However, the first pulse 218 of the driving waveform is made longer, as a longer driving waveform has been found to provide a good initiation of EP particle movement (i.e., to pull the particles off the surface) to start the switching process. In this case, a pulse length of 250 milliseconds is chosen, but this exact length will also be dependent on the particular electrophoretic media, the temperature, the image history, etc. and so must be optimized for each case. A longer pulse waveform is also selected at the very beginning of the balancing section of the waveform in FIG. 2 so as to achieve good switching and the balancing section to exactly match the driving section to achieve the DC balance described earlier.

BISTABILITY IMPROVEMENT USING SHAKING WAVEFORM. The inventors have found that bistability improves if an alternative (plus and minus) voltage is applied across the media with a time too short to switch the media. In effect, this approach prevents packing of the EP particles into a single block at the time of driving the particles to a switch in display state; thus, the approach maintains consistent performance. In FIG. 2, a shaking region 222 of the waveforms 202, 204, 206 shakes the media plus and minus with 200 microsecond pulses, which is too fast to fully switch the media to a different state but fast enough to help disperse partially packed particles.

STATE RESET. For grey scale imaging in particular, it is desirable to set every pixel to a reference state (dark or light) before moving to a grey level, so that the required voltage or time to drive the pixels can be accurately predicted. If driving the display to a reference state cannot be done for every image transition, it is still valuable to do so periodically.

One example of a waveform utilized to perform such a state reset is described further herein in the following sections. In this case, when switching from one grey level image to another, the image is first switched to a halftone version of the second image and then switched a second time to the second grey level image. In this way a stable reference state (dark or light) is set for each pixel before writing the image. An additional advantage of this algorithm is that the image transition appears to be very quick, since the full image is achieved after two write operations, but the second one will appear to the observer to be much like the final image.

Many image switching algorithms are known. These image switching algorithms have the drawback of a slow page turning time for ebooks using electrophoretic display frontplanes. This problem is believed to exist in all EPD ebooks.

There is a strong desire to use electrophoretic display frontplanes for ebooks because they are easy to read (reasonably white, wide angle of view, reasonable contrast, view in reflected light, look like paper) and low power (bistable). However, since electrophoretic materials tend to have slow transition times, the time of switching from one page to another is slower than is normally expected to turn a page in a book, leading to user dissatisfaction. Another factor that exacerbates this is that history and residual image effects and need for state resetting to achieve grey scale, often require a minimum of two or more complete image frames to completely switch images, causing both a further slowdown and introducing unpleasant flashing between images. In an embodiment, an image change algorithm moves from one page to an initial image of the next page in one switch of the media, thus achieving faster page switching time. In an embodiment, half of the image change time used in current versions of ebooks is required.

In an embodiment, a driving circuit causes an EPD ebook to switch from one ebook page to the other in what appears to be one frame. Bipolar drivers are used on the matrix array driving the EPD material, so that pixels can be switched from white to black in one frame time. The approach achieves full image switching in two image frames, but the first one is a binary representation of the next image. By being binary, the full voltage swing is applied to all pixels (providing maximum switching speed) and since every pixel is set to black or white, a reference state is achieved which is useful for achieving accurate grey levels on the next frame. After switching to the binary image, the next image change is from the binary image to the full grey scale image. The grey level is achieved either by time sequence modulation (writing several high speed frames of the backplane at a transition rate too fast to switch the media and choosing the number of frames black and white to achieve the desire grey level) or by changing the analog voltage level on each pixel of the matrix. In either case, the grey level is referenced to the previous state of the pixel in the binary transition image (i.e. white or black).

By transitioning from one page to another in this way, the reader will see a quick transition of the image to something he recognizes in one frame (thus enabling him to rapidly thumb through the book) and will transition into a high quality image on the second frame which he can study and comfortably read.

There are many variants of this general approach which will impact long term life of the media well as the pleasure in the reading experience. Examples are now described.

The binary image may be generated by keeping only the lowest order bit in the grey level, i.e. the image is simply thresholded so that every grey level above some threshold becomes white and every grey level below that threshold becomes black.

The binary image may threshold the text, but use digital halftoning on pictures. In this way the image which appears on the first pulse will appear at a glance just like the grey scale image and will gracefully transition into the high quality grey scale image.

The binary image may threshold the text, and leave an image blank on the first frame, driving the image area to a uniform white or black, and then switch directly to the grey level image on the second transition.

CORRECTION SIGNALS. The approach as defined herein may be combined with correction waveforms or compensation circuits to achieve DC balance, freedom from driving to one state too many times, image pixel histogram equalization for the lifetime of a display based on an amount and type of usage of each pixel, bistability, etc. For example, if a pixel in the first image is white or black, and the second and or third image requires the pixel to be in the same state, then that pixel may not be driven at all. For another example, if the long term impact of driving one pixel is not DC-balanced, then an additional correction waveform may be driven after some period of time to correct for this issue. Any of the other correction approaches described in preceding sections can be combined with the approach herein to achieve a smooth and fast image transition and good lifetime.

Examples of correction signaling approaches are described in U.S. application 60/942,585, filed Jun. 7, 2007, the entire contents of which is hereby incorporated by reference as if fully set forth herein.

In one embodiment, a correction waveform is applied to ensure global DC balance (i.e., the average voltage applied across the display is substantially zero when integrated over a time period). Global DC balance (i.e., the average voltage applied across a display medium integrated over a time period) is considered achieved if an imbalance of less than 90 volt·sec (i.e., 0 to about 90 volt·sec) is accumulated over a period of about 60 seconds, preferably over a period of about 60 minutes, or more preferably over a period of about 60 hours. The driving method may also be applied to correct any of the imbalance in the first, second, third, fourth or fifth aspect of the disclosure as described above. The correction waveform is applied at a later time so that it does not interfere with the driving of pixels to intended images. The global DC balance and other types of balance as described in the present disclosure are important for maintaining the maximum long term contrast and freedom from residual images.

In one embodiment, smart electronics is used to correct for the imbalance at periodic intervals, with an equalizing waveform. A smart controller may be used in this method to keep track of the level of imbalance, and correct for it on a regular basis. The controller may comprise a memory element which records the cumulative amount of voltage across each pixel, or number of resets to a given color state for each pixel, in a given time period. At some periodic interval (i.e., once a time period, or some time after each sequence of waveforms), a separate correction waveform is applied which exactly compensates for the imbalance recorded in the memory. This correction may be accomplished either at a separate time when the display device would not be expected to be in use, or when it would not interfere with the driving of the intended images, or as part of another planned waveform so that it is not visually detectable. Several embodiments of this driving method can be envisioned, depending on the applications. A few of these are described as follows.

In a first embodiment, a correction waveform is used and the imbalance may be corrected at a time when a display device is not in operation, for example, in the middle of the night or at a predetermined time when the display device is not expected to be in use. Although many applications are perceived for this method of achieving the balance, a smart card application is one of the examples which may benefit from it. When a smart card is used, the user wants to review the information displayed as quickly and easily as possible, but then leaves the card in the user's wallet most of the time, so that a correction waveform applied at a later time will rarely be detected by the user.

In a second embodiment, no equalizing waveform is required. Instead, a longer driving pulse is applied. This approach is particularly useful if the extended state is at the end of a driving sequence so that there would be no visual impact on the image displayed. The additional amount of time required for the driving pulse is determined by a controller and it must be sufficiently long in order to compensate for the imbalance which has been stored in the memory based on the driving history of the pixels. An imbalance of too many white pixels may be corrected by applying a longer driving pulse when the white pixels are driven to the dark state, especially if the dark state occurs at the end of a driving sequence. Such a waveform extension can be used to correct for DC imbalance or integrated absolute value compensation (i.e., the first aspect of this disclosure). In aspects of the disclosure involving equalization of the number of resets, the extended waveform comprises of a number of resets may be applied to achieve the result.

In a third embodiment of this driving method, the imbalance may also be corrected with a white flash at the beginning of the next sequence of waveforms. For the global DC balance, this will allow for a zero time average DC bias and give clean images. However this driving method may give an undesirable initial display flash at the time of initiation of a new sequence.

Figure 3:
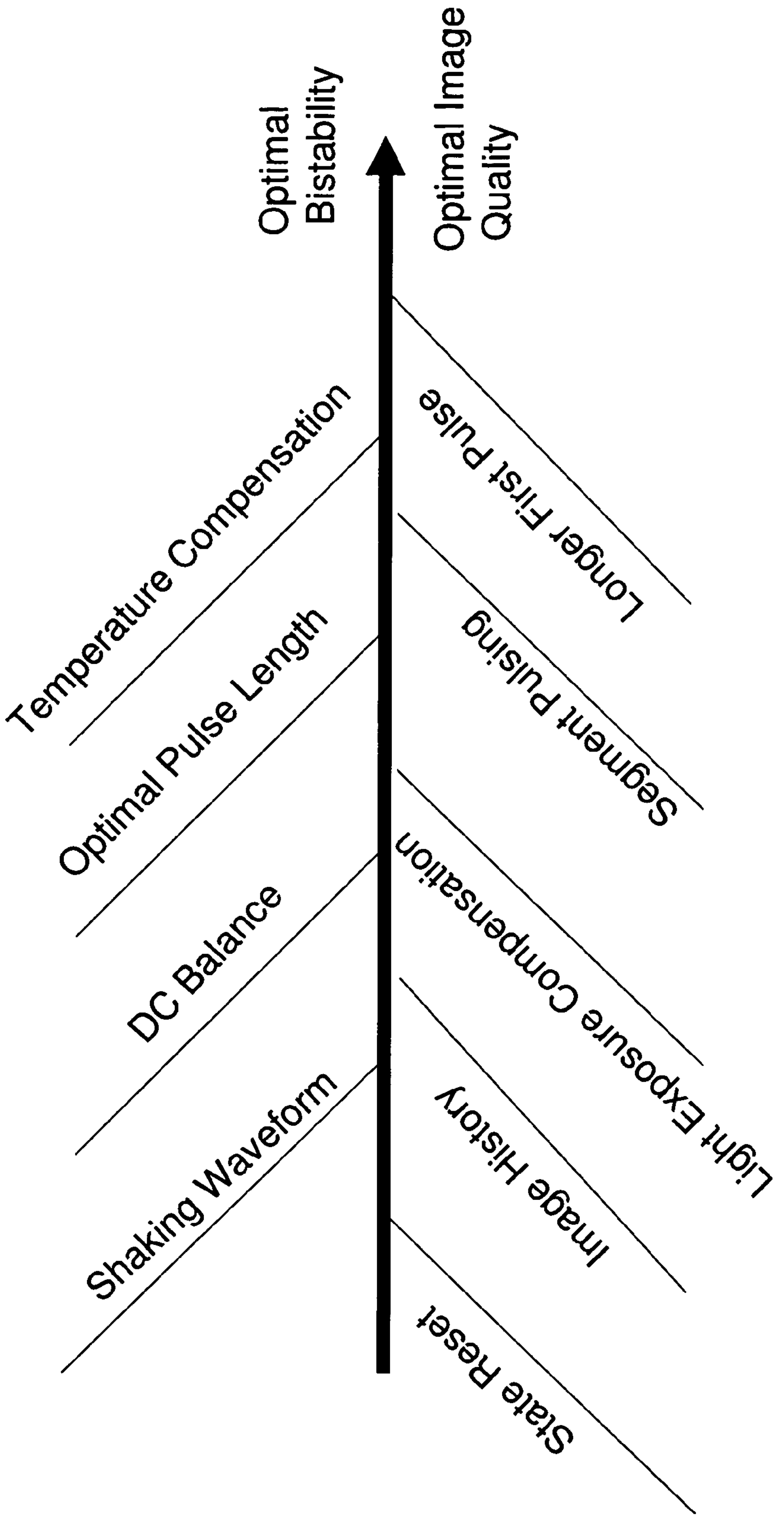
FIG. 3 illustrates EPD image quality optimization issues addressed in the present disclosure.

FIG. 3 illustrates EPD image quality optimization issues addressed in the present disclosure. In various embodiments, circuits, methods, and waveforms provide one or more of a shaking waveform, DC balance, optimal pulse length, temperature compensation, state reset, image history, light exposure compensation, segment pulsing, and a longer first pulse. As indicated by the fishbone arrangement of FIG. 3, each of the foregoing characteristics contributes to one or more of optimal bistability and/or optimal image quality in an EPD or other bistable display.

Figure 4:
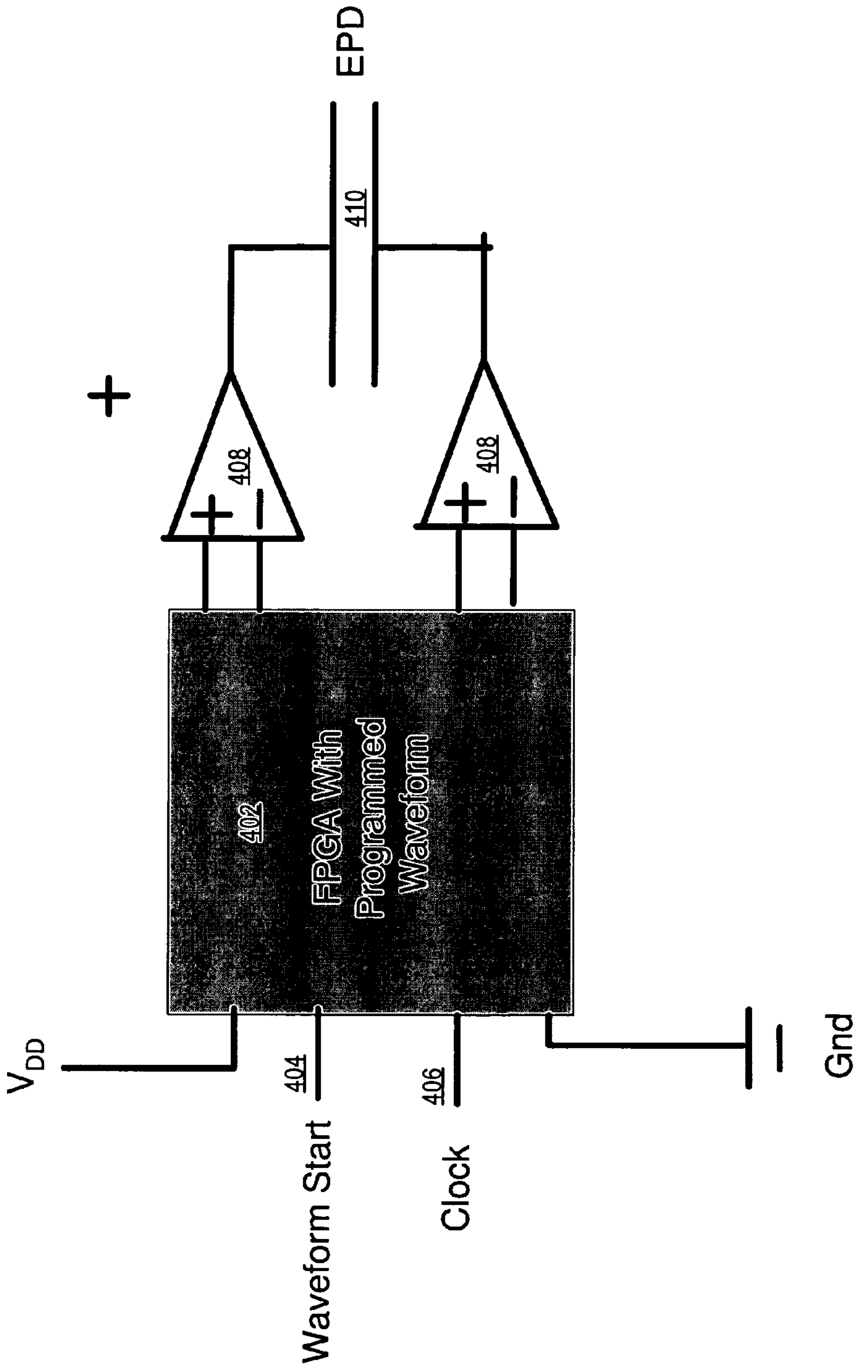
FIG. 4 illustrates an example driving circuit applicable to any of the driving waveforms and methods of the present disclosure.

FIG. 4 illustrates an example driving circuit applicable to any of the driving waveforms and methods of the present disclosure. In an embodiment, a field programmable gate array (FPGA) 402 is programmed with a gate arrangement that is configured to generate one or more of the waveforms shown in FIG. 2. The FPGA 402 receives as input a waveform start signal 404, a clock signal 406, and is coupled to a supply voltage $V_{DD}$ and a ground terminal. Output from the FPGA 402 is coupled to operational amplifiers 408, which are coupled to a bistable display such as EPD 410, which may have the configuration of FIG. 1. The operational amplifiers 408 broadly represent driving circuitry and more components than shown in FIG. 4 may be used in a particular embodiment to drive particular media.

Examples

Figure 5A:
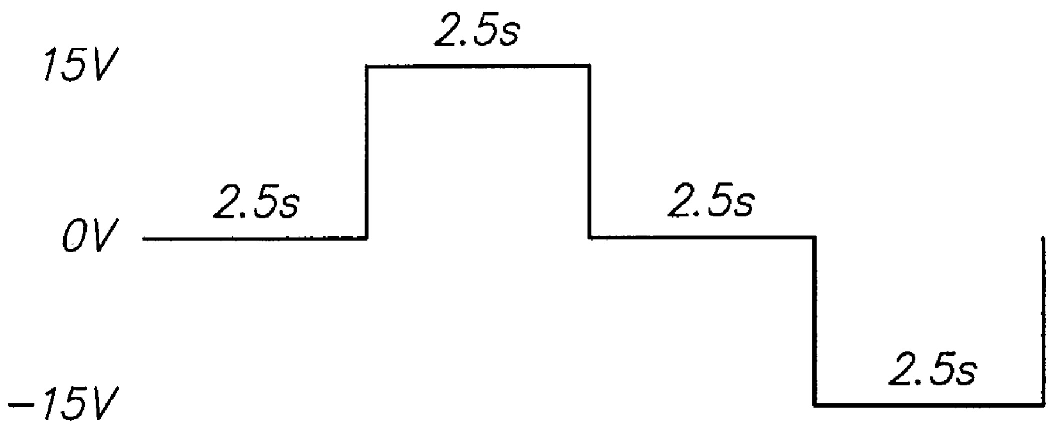
FIG. 5A is a waveform that is DC balanced.
Figure 5B:
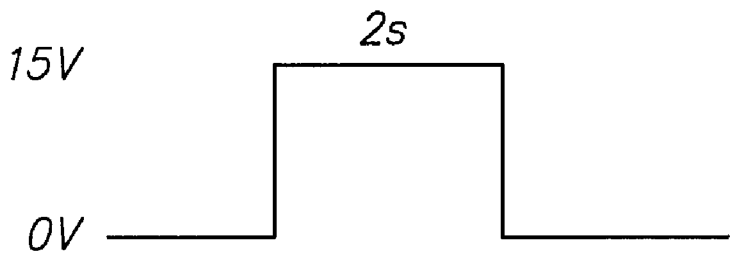
FIG. 5B shows a waveform that is not DC balanced.

The following example demonstrates how DC balance may improve the performance of an electrophoretic display device. FIG. 5A is a waveform that is DC balanced. FIG. 5B shows a waveform that is not DC balanced. The bistability of a display device, after 10,000 cycles within 1 minute of continuous pushing the particles to the white state, using the waveform of FIG. 5A, showed 0% Dmin loss (0.68 vs. 0.68). However, the bistability of the same display device, after only 1,000 cycles within 1 minute of continuous operation, using the waveform of FIG. 5B, showed 10% Dmin loss (0.60 vs. 0.66). This represents, for this particular media, a drop in reflectance from 25% to 22%.

Figure 6:
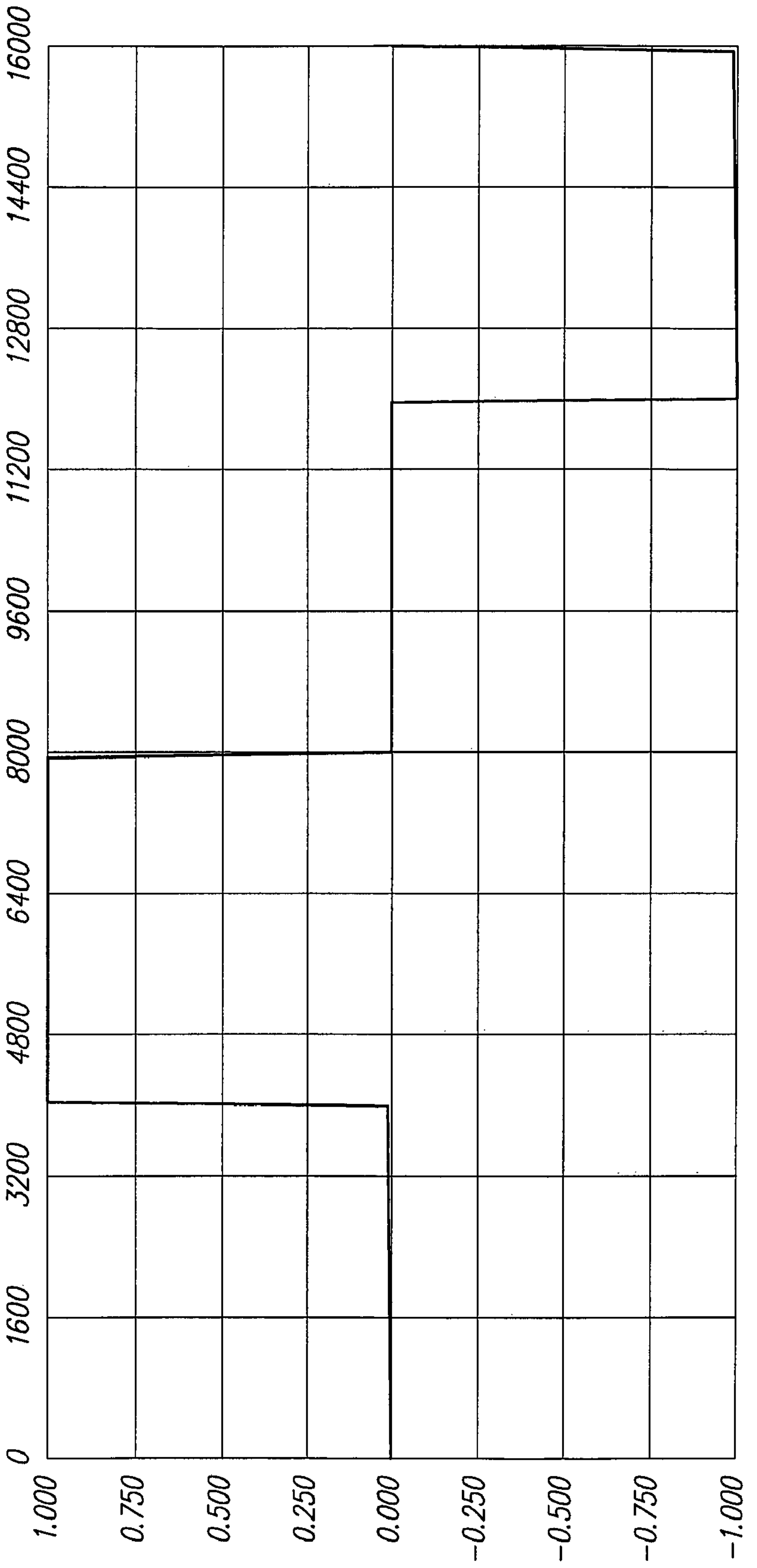
FIG. 6 is an example waveform.

A second example demonstrates how the driving time may affect the performance of a display device. FIG. 6 is an example waveform. In experiments, the above waveform was set at 1.25 sec, 2.5 sec or 5 sec. The test data are summarized in the following table:

| | | Pulse Time | | |
|---|---|---|---|---|
| | | 1.25 sec | 2.5 sec | 5 sec |
| Reverse Bias % | Dmin | 0.0% | 3.1% | 11.5% |
| | Dmax | 0.0% | 3.1% | 3.1% |

In the table, the "reverse bias %" value indicates the percentage loss of Dmin or Dmax when the applied voltage was removed after the waveform was complete. The results indicate that, in this example, the 1.25 sec driving time showed no reverse bias.

As a further example, the table below shows how the response time (Ton) may be affected by temperature. As shown, the response time increases when the display device is operated under lower temperatures. The table also shows that the driving time may be adjusted to accommodate for the loss of speed due to the temperature effect.

| Temp | Ton (ms) | Recommended driving time (ms) | Achieved Contrast |
|---|---|---|---|
| 50 | 164 | 246 | 8:1 |
| 45 | 172 | 279 | 8:1 |
| 40 | 156 | 297 | 8:1 |
| 35 | 185 | 338 | 8:1 |
| 30 | 250 | 375 | 8:1 |

Figure 7:
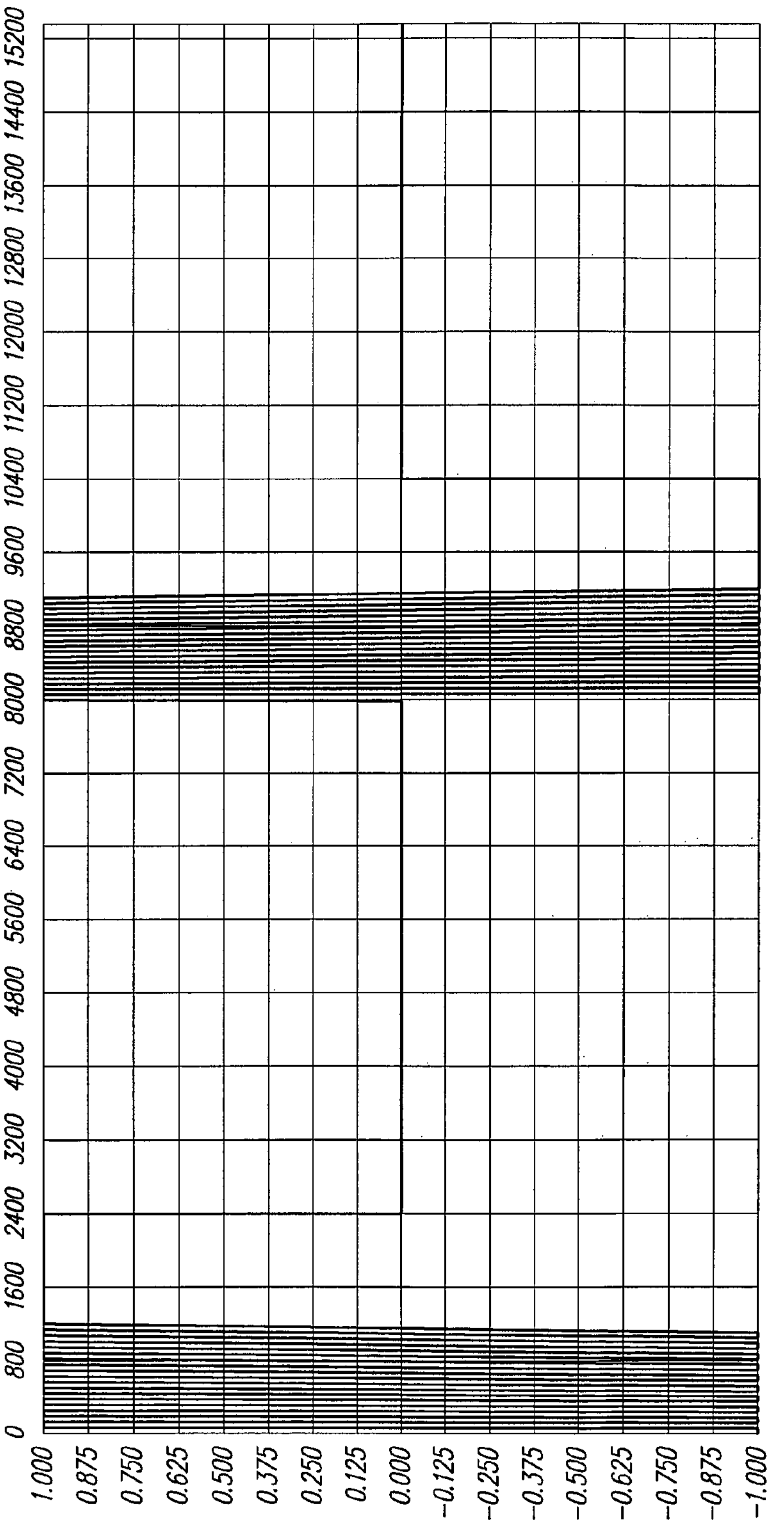
FIG. 7 shows a first example waveform with shaking and long pulses.

FIG. 7 shows a waveform with shaking and long pulses. In an experiment, when this waveform was applied to an electrophoretic display film at 20V under 40° C. and 90% humidity, the film showed a significant loss of contrast ratio after only 92 hours. The data are summarized in the following table.

| Time | Dmin | Dmax | Contrast Ratio | Δ Contrast Ratio |
|---|---|---|---|---|
| 0 hour | 0.79 | 1.60 | 6.46 | — |
| 26 hours | 0.80 | 1.58 | 6.03 | 6.7% |
| 44 hours | 0.85 | 1.55 | 5.01 | 22.4% |
| 92 hours | 0.91 | 1.54 | 4.27 | 33.9% |

Figure 8:
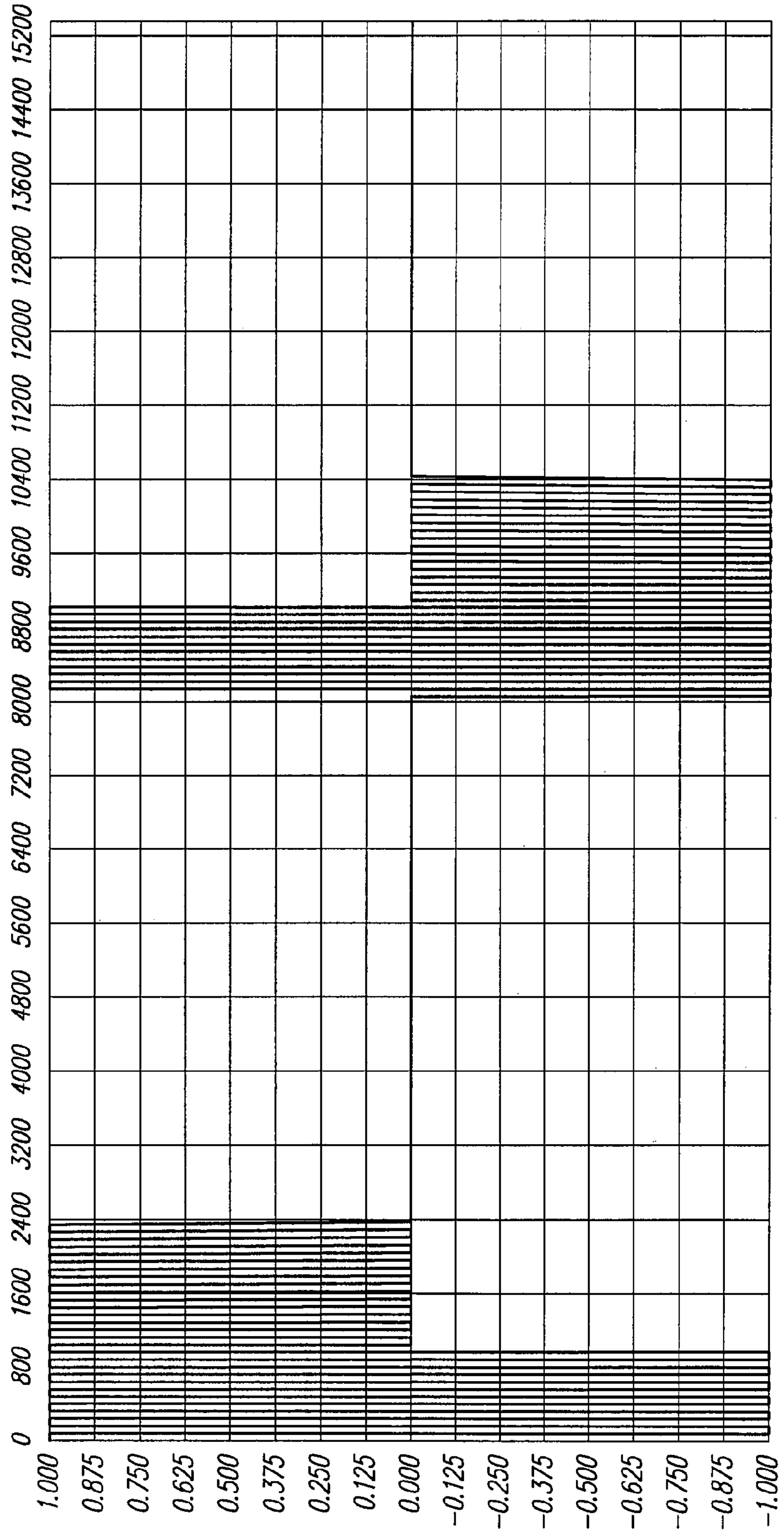
FIG. 8 shows a second example waveform with shaking and long pulses.

FIG. 8 shows a waveform with shaking and long pulses. In an experiment, when the waveform of FIG. 8 was applied at 40V under 40° C. and 90% humidity, even at a much higher voltage (which was expected to have more negative impact on the film) and after 184 hours, the contrast ratio loss of the film was limited to less than 10%. The data are summarized in the following table.

| Time | Dmin | Dmax | Contrast Ratio | Δ Contrast Ratio |
|---|---|---|---|---|
| 0 hour | 0.75 | 1.69 | 8.71 | — |
| 15 hours | 0.75 | 1.67 | 8.32 | 4.5% |
| 136 hours | 0.76 | 1.66 | 7.94 | 8.8% |
| 184 hours | 0.76 | 1.66 | 7.94 | 8.8% |

Variations and Extensions

Although the foregoing invention has been described in some detail for purposes of clarity of understanding, it will be apparent that certain changes and modifications may be practiced within the scope of the appended claims. It should be noted that there are many alternative ways of implementing both the process and apparatus of the improved driving scheme for an electrophoretic display, and for many other types of displays including, but not limited to, liquid crystal, rotating ball, dielectrophoretic and electrowetting types of displays.

Further, the waveforms, pulses, and frames described herein may be applied in various combinations other than previously described. For example, in one embodiment, the shaking pulses 222 of FIG. 2 are omitted. In another embodiment, the shaking pulses 222 are applied to a display first, followed by the DC balancing segment 208. In general, the left-to-right order of pulses, segments, or frames shown in FIG. 2 is not required, and other embodiments may use a different order.

In other embodiments, a range of different pulse widths may be used within each frame. For example, the shaking pulses 222 may comprise a plurality of different pulse widths. The DC balancing segment 208 may comprise a plurality of pulse pairs in which the pulses in one pair have a different width than pulses in another pair. The pulse widths or times need not be regular but may conform to a particular pattern of values, or may be selected randomly.

In other embodiments, segments of frames of the waveforms of FIG. 2 may be interleaved. For example, a sub-segment of the DC balancing segment 208 may be applied, followed by a sub-segment of the shaking pulses 222, followed by another sub-segment of the DC balancing segment 208, followed by more shaking pulses, etc. Interleaving also may be used for other waveform frames or segments of the kinds described above, such as a temperature compensation frame, light exposure compensation frame, time compensation frame, etc. In general, frames or segments of pulses directed to each of the techniques described above may be combined in an interleaved manner in a waveform. Generally, the driving frame is applied without interleaving or interruption to ensure correct driving of particles to desired states in the display.

Accordingly, the present embodiments are to be considered as illustrative and not restrictive, and the invention is not to be limited to the details given herein, but may be modified within the scope and equivalents of the appended claims.

What is claimed is:

1. A method, comprising:

applying, across a bistable display device, a pre-writing signal comprising a plurality of DC voltage pulses each driven for a first time that is shorter than necessary to drive the display device to a particular state;

applying, across the device, a shaking signal comprising a plurality of positive and negative pulses each driven for a second time to disperse partially packed particles;

applying, across the device, one or more driving signals for third times that are sufficient to drive the display device to the particular display state;

receiving an ambient temperature value representing a current ambient temperature of the display device;

increasing each of the first time, the second time, and the third times inversely as a function of the ambient temperature value.

2. The method of claim 1, wherein each of the first time and the second time is in the range 10 ms to 500 ms.

3. The method of claim 1, wherein the pre-writing signal is applied before the shaking signal.

4. The method of claim 1, wherein the pre-writing signal further comprises a second plurality of DC balanced DC voltage pulses each driven for a fourth time, wherein the fourth time is longer than the first time.

5. The method of claim 1, wherein the third times are long enough to cause electrophoretic particles in the display device to cross media cells of the display device to result in changing an appearance of an image on the display device but short enough to prevent charge buildup within the media cells.

6. A method, comprising:

applying, across a bistable display device, a pre-writing signal comprising a plurality of DC voltage pulses each driven for a first time that is shorter than necessary to drive the display device to a particular state;

applying, across the device, a shaking signal comprising a plurality of positive and negative pulses each driven for a second time to disperse partially packed particles;

applying, across the device, one or more driving signals for third times that are sufficient to drive the display device to the particular display state;

determining an idle time of the display device representing a last time at which a driving signal was applied to the display device prior to the one or more driving signals;

increasing the third times as a function of a magnitude of the idle time.

7. The method of claim 6, wherein each of the first time and the second time is in the range 10 ms to 500 ms.

8. The method of claim 6, wherein the first time is 100 ms and the second time is 200 ms.

9. The method of claim 6, wherein the pre-writing signal is applied before the shaking signal.

10. The method of claim 6, wherein the pre-writing signal further comprises a second plurality of DC balanced DC voltage pulses each driven for a fourth time, wherein the fourth time is longer than the first time.

11. The method of claim 10, wherein the first time is 100 ms and the second time is 250 ms.

12. The method of claim 6, wherein the third times are long enough to cause electrophoretic particles in the display device to cross media cells of the display device to result in changing an appearance of an image on the display device but short enough to prevent charge buildup within the media cells.

13. The method of claim 6, wherein average voltages of the pre-writing signal and of the driving signal are substantially zero when integrated over a time period.

14. A method, comprising:

applying, across a bistable display device, a pre-writing signal comprising a plurality of DC voltage pulses each driven for a first time that is shorter than necessary to drive the display device to a particular state;

applying, across the device, a shaking signal comprising a plurality of positive and negative pulses each driven for a second time to disperse partially packed particles;

applying, across the device, one or more driving signals for third times that are sufficient to drive the display device to the particular display state;

determining an idle time of the display device representing a last time at which a driving signal was applied to the display device;

repeating the applying steps one or more times as a function of a magnitude of the idle time.

15. The method of claim 14, wherein each of the first time and the second time is in the range 10 ms to 500 ms.

16. The method of claim 14, wherein the pre-writing signal is applied before the shaking signal.

17. The method of claim 14, wherein the pre-writing signal further comprises a second plurality of DC balanced DC voltage pulses each driven for a fourth time, wherein the fourth time is longer than the first time.

18. The method of claim 14, wherein the third times are long enough to cause electrophoretic particles in the display device to cross media cells of the display device to result in changing an appearance of an image on the display device but short enough to prevent charge buildup within the media cells.

19. A method, comprising:

applying, across a bistable display device, a pre-writing signal comprising a plurality of DC voltage pulses each driven for a first time that is shorter than necessary to drive the display device to a particular state;

applying, across the device, a shaking signal comprising a plurality of positive and negative pulses each driven for a second time to disperse partially packed particles;

applying, across the device, one or more driving signals for third times that are sufficient to drive the display device to the particular display state;

determining an operating time of the display device representing a total time during which the display device has operated;

as a function of a magnitude of the operating time, performing any one or more of:

increasing the third times as a function of the magnitude; increasing a voltage of the driving signals as a function of the magnitude; repeating the applying steps one or more times.

20. The method of claim 19, wherein each of the first time and the second time is in the range 10 ms to 500 ms.

21. The method of claim 19, wherein the pre-writing signal is applied before the shaking signal.

22. The method of claim 19, wherein the pre-writing signal further comprises a second plurality of DC balanced DC voltage pulses each driven for a fourth time, wherein the fourth time is longer than the first time.

23. The method of claim 19, wherein the third times are long enough to cause electrophoretic particles in the display device to cross media cells of the display device to result in changing an appearance of an image on the display device but short enough to prevent charge buildup within the media cells.

24. A method, comprising:

applying, across a bistable display device, a pre-writing signal comprising a plurality of DC voltage pulses each driven for a first time that is shorter than necessary to drive the display device to a particular state;

applying, across the device, a shaking signal comprising a plurality of positive and negative pulses each driven for a second time to disperse partially packed particles;

applying, across the device, one or more driving signals for third times that are sufficient to drive the display device to the particular display state;

determining a light exposure value representing an amount of light exposure that the display device has received;

as a function of a magnitude of the light exposure value, performing any one or more of:

increasing the third times as a function of the magnitude; increasing a voltage of the driving signals as a function of the magnitude; repeating the applying steps one or more times.

25. The method of claim 24, wherein each of the first time and the second time is in the range 10 ms to 500 ms.

26. The method of claim 24, wherein the pre-writing signal is applied before the shaking signal.

27. The method of claim 24, wherein the pre-writing signal further comprises a second plurality of DC balanced DC voltage pulses each driven for a fourth time, wherein the fourth time is longer than the first time.

28. The method of claim 24, wherein the third times are long enough to cause electrophoretic particles in the display device to cross media cells of the display device to result in changing an appearance of an image on the display device but short enough to prevent charge buildup within the media cells.

29. An electronic circuit, comprising:

a field programmable gate array (FPGA);

a driver circuit coupled to the FPGA and configured to drive a bistable display device having a common conductor and an image driving conductor;

wherein the FPGA is configured to receive a supply voltage and to generate, in response to a trigger signal, an output signal comprising:

a pre-writing signal comprising a plurality of DC voltage pulses each driven for a first time that is shorter than necessary to drive the display device to a particular state;

a shaking signal comprising a plurality of positive and negative pulses each driven for a second time to disperse partially packed particles;

one or more driving signals for third times that are sufficient to drive the display device to the particular display state;

a temperature compensation circuit coupled to the FPGA and configured to generate an ambient temperature value representing a current ambient temperature of the display device;

gates in the FPGA configured for increase each of the first time, the second time, and the third times inversely as a function of the ambient temperature value.

30. An electronic circuit, comprising:

a field programmable gate array (FPGA);

a driver circuit coupled to the FPGA and configured to drive a bistable display device having a common conductor and an image driving conductor;

wherein the FPGA is configured to receive a supply voltage and to generate, in response to a trigger signal, an output signal comprising:

a pre-writing signal comprising a plurality of DC voltage pulses each driven for a first time that is shorter than necessary to drive the display device to a particular state;

a shaking signal comprising a plurality of positive and negative pulses each driven for a second time to disperse partially packed particles;

one or more driving signals for third times that are sufficient to drive the display device to the particular display state;

a clock circuit coupled to the FPGA and configured to determine an idle time of the display device representing a last time at which a driving signal was applied to the display device;

gates in the FPGA configured to increase the third times as a function of a magnitude of the idle time.

31. The circuit of claim 30, wherein the pre-writing signal further comprises a second plurality of DC balanced DC voltage pulses each driven for a fourth time, wherein the fourth time is longer than the first time.

32. The circuit of claim 30, wherein the third times are long enough to cause electrophoretic particles in the display device to cross media cells of the display device to result in changing an appearance of an image on the display device but short enough to prevent charge buildup within the media cells.

33. The circuit of claim 30, wherein average voltages of the pre-writing signal and of the driving signal are substantially zero when integrated over a time period.

34. An electronic circuit, comprising:

a field programmable gate array (FPGA);

a driver circuit coupled to the FPGA and configured to drive a bistable display device having a common conductor and an image driving conductor;

wherein the FPGA is configured to receive a supply voltage and to generate, in response to a trigger signal, an output signal comprising:

a pre-writing signal comprising a plurality of DC voltage pulses each driven for a first time that is shorter than necessary to drive the display device to a particular state;

a shaking signal comprising a plurality of positive and negative pulses each driven for a second time to disperse partially packed particles;

one or more driving signals for third times that are sufficient to drive the display device to the particular display state;

a clock circuit coupled to the FPGA and configured to determine an operating time of the display device representing a total time during which the display device has operated;

gates in the FPGA configured to perform, as a function of a magnitude of the operating time, any one or more of: increasing the third times as a function of the magnitude; increasing a voltage of the driving signals as a function of the magnitude; repeating the applying steps one or more times.

35. The circuit of claim 34, wherein the pre-writing signal further comprises a second plurality of DC balanced DC voltage pulses each driven for a fourth time, wherein the fourth time is longer than the first time.

36. The circuit of claim 34, wherein the third times are long enough to cause electrophoretic particles in the display device to cross media cells of the display device to result in changing an appearance of an image on the display device but short enough to prevent charge buildup within the media cells.

37. The circuit of claim 34, wherein average voltages of the pre-writing signal and of the driving signal are substantially zero when integrated over a time period.

38. An electronic circuit, comprising:

a field programmable gate array (FPGA);

a driver circuit coupled to the FPGA and configured to drive a bistable display device having a common conductor and an image driving conductor;

wherein the FPGA is configured to receive a supply voltage and to generate, in response to a trigger signal, an output signal comprising:

a pre-writing signal comprising a plurality of DC voltage pulses each driven for a first time that is shorter than necessary to drive the display device to a particular state;

a shaking signal comprising a plurality of positive and negative pulses each driven for a second time to disperse partially packed particles;

one or more driving signals for third times that are sufficient to drive the display device to the particular display state;

a light exposure circuit coupled to the FPGA and configured to determine a light exposure value representing an amount of light exposure that the display device has received;

gates in the FPGA configured to perform, as a function of a magnitude of the light exposure value, any one or more of: increasing the third times as a function of the magnitude; increasing a voltage of the driving signals as a function of the magnitude; repeating the applying steps one or more times.

39. The circuit of claim 38, wherein the pre-writing signal further comprises a second plurality of DC balanced DC voltage pulses each driven for a fourth time, wherein the fourth time is longer than the first time.

40. The circuit of claim 38, wherein the third times are long enough to cause electrophoretic particles in the display device to cross media cells of the display device to result in changing an appearance of an image on the display device but short enough to prevent charge buildup within the media cells.

41. The circuit of claim 38, wherein average voltages of the pre-writing signal and of the driving signal are substantially zero when integrated over a time period.

* * * * *